(12) United States Patent
Walker

(10) Patent No.: US 10,354,562 B2
(45) Date of Patent: Jul. 16, 2019

(54) IDENTIFICATION TAG COVERING DEVICE

(71) Applicant: Robert Walker, Wright, MN (US)

(72) Inventor: Robert Walker, Wright, MN (US)

( * ) Notice: Subject to any disclaimer, the term of this patent is extended or adjusted under 35 U.S.C. 154(b) by 0 days.

(21) Appl. No.: 15/672,947

(22) Filed: Aug. 9, 2017

(65) Prior Publication Data

US 2019/0051220 A1 Feb. 14, 2019

(51) Int. Cl.
G09F 3/20 (2006.01)
A01K 11/00 (2006.01)

(52) U.S. Cl.
CPC .............. *G09F 3/201* (2013.01); *A01K 11/00* (2013.01)

(58) Field of Classification Search
CPC ................................. G09F 3/201; A01K 11/00
See application file for complete search history.

(56) References Cited

U.S. PATENT DOCUMENTS

| 1,246,369 | A | * | 11/1917 | Winans | G09F 3/00 |
| | | | | | 40/661.05 |
| 2,982,041 | A | * | 5/1961 | Kent | E05B 19/24 |
| | | | | | 40/330 |
| 4,259,798 | A | | 4/1981 | McConnell | |
| 4,739,566 | A | | 4/1988 | Smith | |
| 5,113,602 | A | * | 5/1992 | Levine | G09F 3/08 |
| | | | | | 40/330 |
| 5,291,768 | A | * | 3/1994 | Rieffel | A44B 15/00 |
| | | | | | 40/634 |
| 5,414,948 | A | * | 5/1995 | Kudo | G09F 3/20 |
| | | | | | 40/651 |
| 6,151,823 | A | * | 11/2000 | Gregory-Gillman | G09F 3/20 |
| | | | | | 383/35 |
| 6,202,335 | B1 | * | 3/2001 | Shelton | G09F 3/20 |
| | | | | | 206/449 |
| D458,421 | S | | 6/2002 | Wasserman et al. | |
| 7,490,716 | B2 | * | 2/2009 | Pleven | A47F 7/0057 |
| | | | | | 206/0.8 |
| 7,861,443 | B2 | | 1/2011 | Hill | |
| 7,877,909 | B1 | | 2/2011 | Hagen et al. | |
| D799,761 | S | * | 10/2017 | Dia | D30/199 |
| 2003/0033737 | A1 | | 2/2003 | Bradshaw et al. | |
| 2014/0283424 | A1 | | 9/2014 | Cope | |

* cited by examiner

Primary Examiner — Cassandra Davis

(57) ABSTRACT

A identification tag covering device for deterring catching of a covered identification tag includes a pair of rings that is selectively mutually couplable. A hinge is coupled to and extends between the rings. The rings are selectively positionable in an open configuration so that the rings are configured to insert an identification tag. The rings also are selectively positionable in a closed configuration wherein the rings are coupled to the identification tag. Indicia that are positioned on the identification tag are visible. Each of a pair of extrusions is coupled to and extends from a respective ring proximate to the hinge. The extrusions are configured to deter insertion of the rings into a narrow space, such as a gap between boards of a deck. At least one cutout, which is positioned through the pair of rings, is configured to position a coupler that is coupled to the identification tag.

14 Claims, 5 Drawing Sheets

IDENTIFICATION TAG COVERING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

Figure 1:
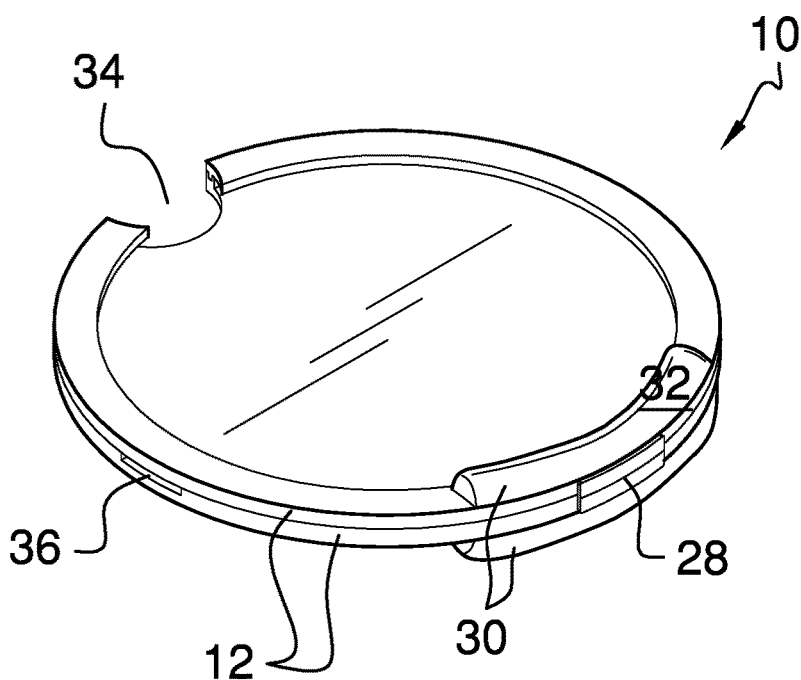

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98.

The disclosure and prior art relates to covering devices and more particularly pertains to a new covering device for deterring catching of a covered identification tag.

BRIEF SUMMARY OF THE INVENTION

An embodiment of the disclosure meets the needs presented above by generally comprising a pair of rings that is selectively mutually couplable. A hinge is coupled to and extends between the rings. The rings are selectively positionable in an open configuration so that the rings are configured to insert an identification tag. The rings also are selectively positionable in a closed configuration wherein the rings are coupled to the identification tag. Indicia that are positioned on the identification tag are visible. Each of a pair of extrusions is coupled to and extends from a respective ring proximate to the hinge. The extrusions are configured to deter insertion of the rings into a narrow space, such as a gap between boards of a deck. At least one cutout, which is positioned through the pair of rings, is configured to position a coupler that is coupled to the identification tag.

There has thus been outlined, rather broadly, the more notable features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

Figure 2:
Figure 3:
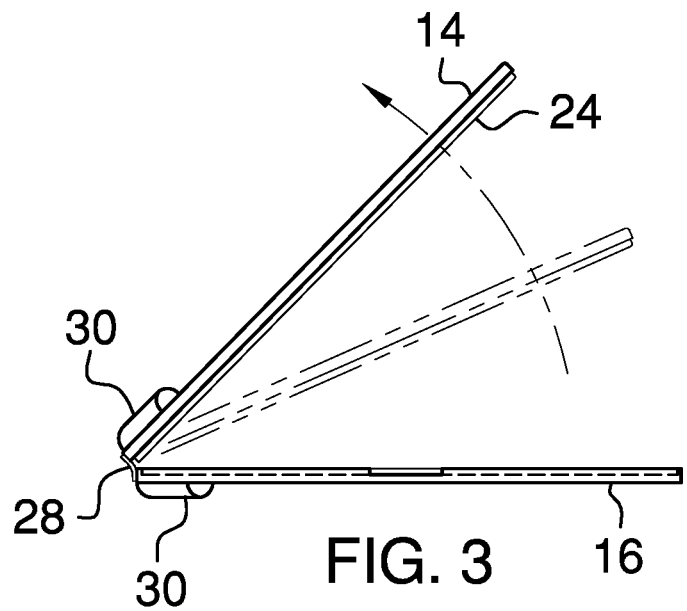
Figure 4:
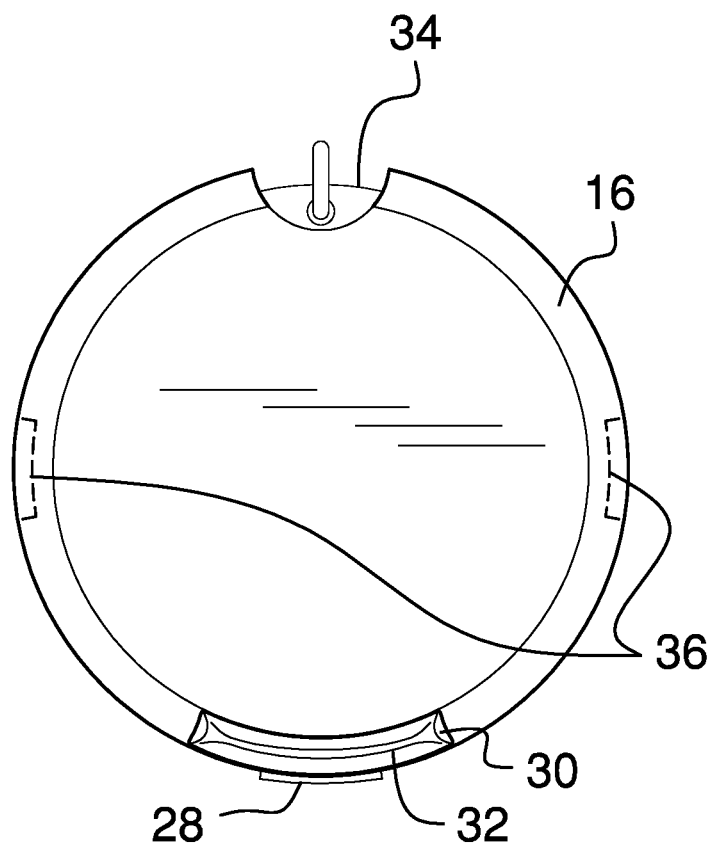
Figure 5:
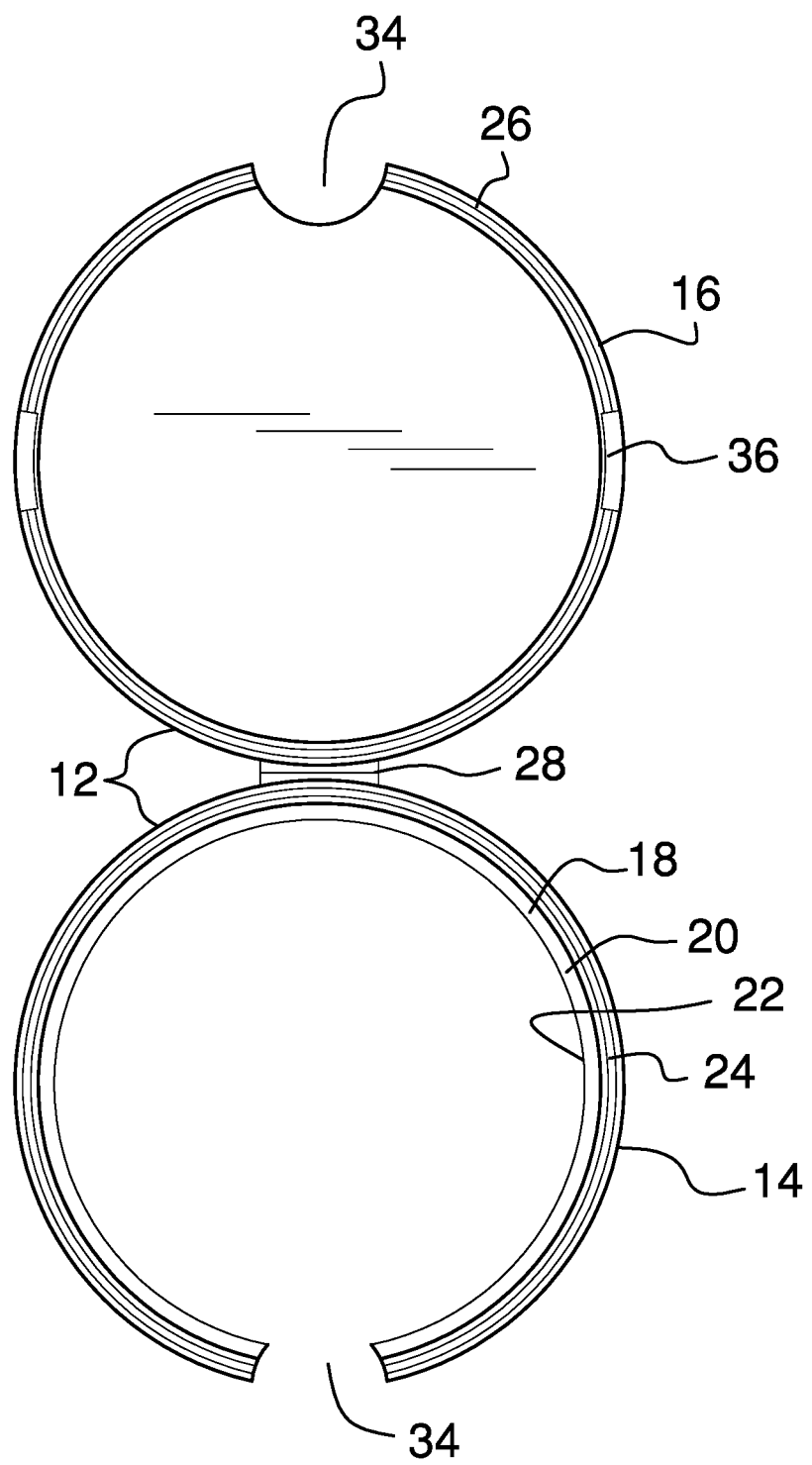
Figure 6:
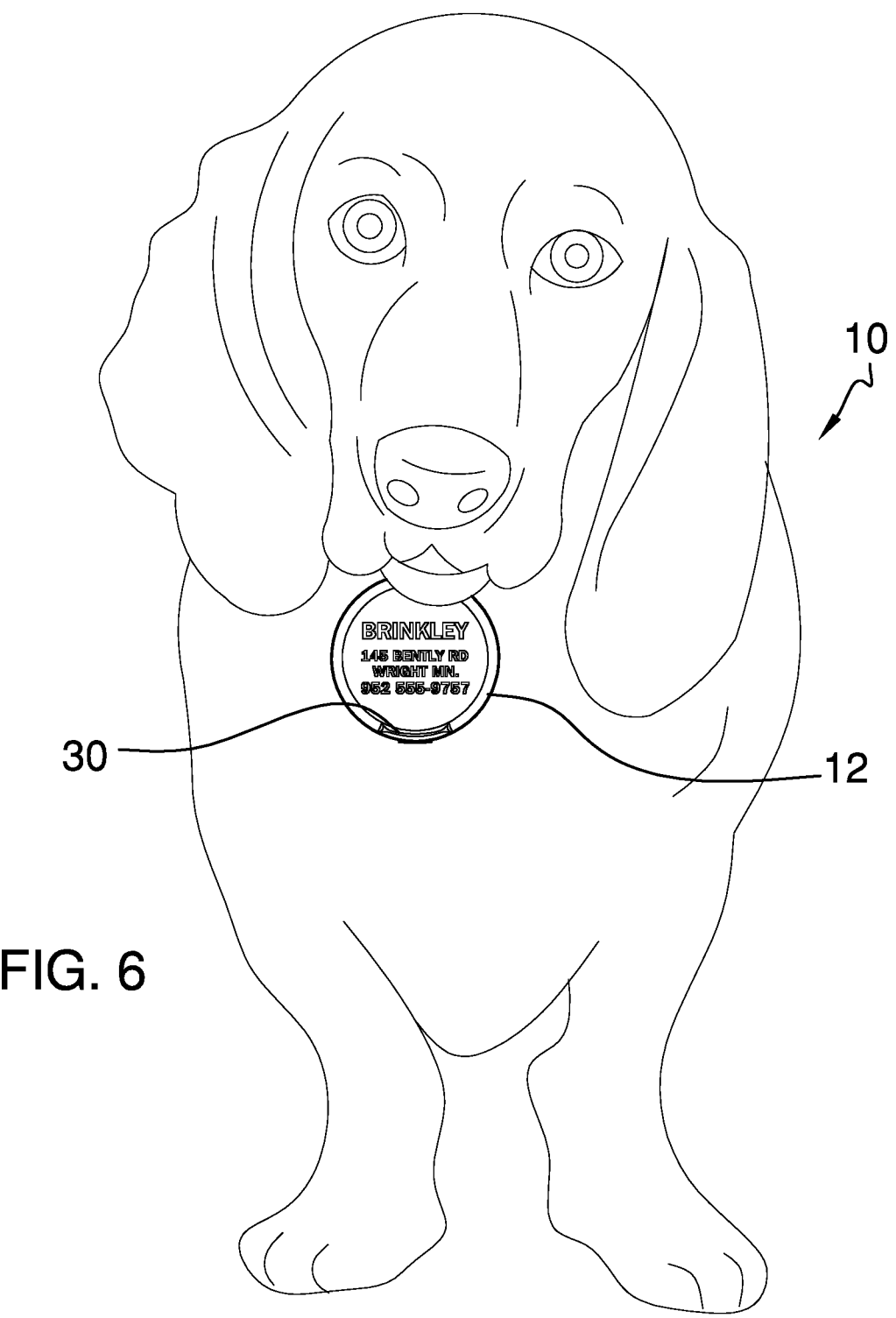
Figure 7:
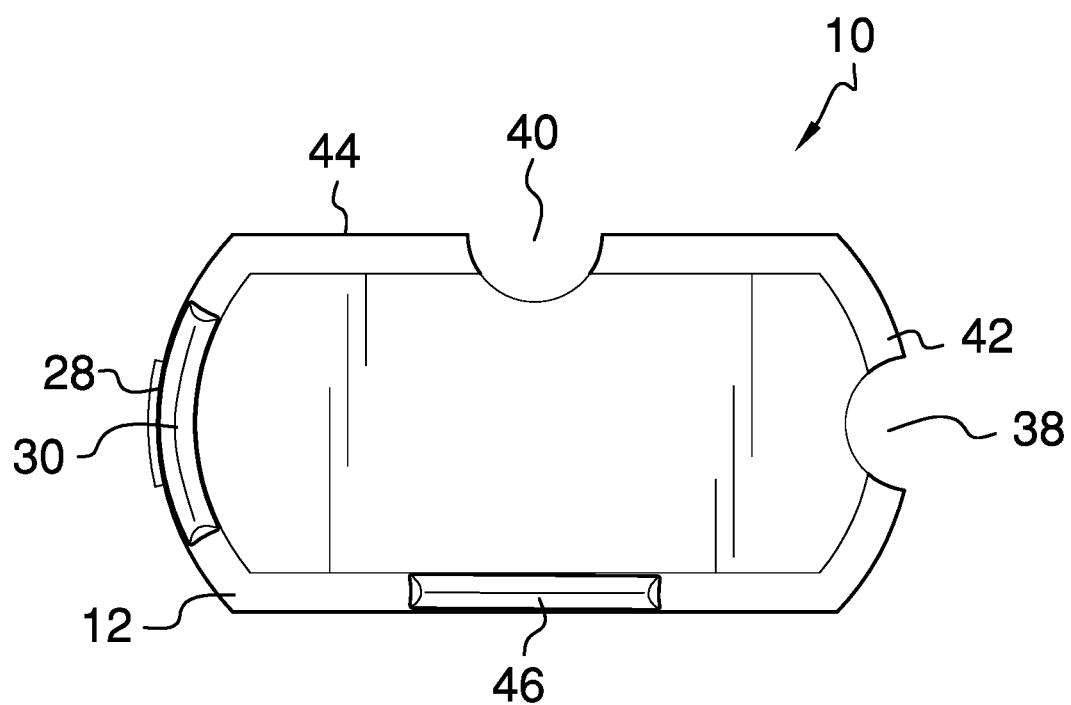

The disclosure will be better understood and objects other than those set forth above will become apparent when consideration is given to the following detailed description thereof. Such description makes reference to the annexed drawings wherein:

FIG. 1 is an isometric perspective view of an identification tag covering device according to an embodiment of the disclosure.
FIG. 2 is a front view of an embodiment of the disclosure.
FIG. 3 is a side view of an embodiment of the disclosure.
FIG. 4 is a back view of an embodiment of the disclosure.
FIG. 5 is a front view of an embodiment of the disclosure.
FIG. 6 is an in-use view of an embodiment of the disclosure.
FIG. 7 is a front view of an embodiment of the disclosure.

DETAILED DESCRIPTION OF THE INVENTION

With reference now to the drawings, and in particular to FIGS. 1 through 7 thereof, a new covering device embodying the principles and concepts of an embodiment of the disclosure and generally designated by the reference numeral 10 will be described.

As best illustrated in FIGS. 1 through 7, the identification tag covering device 10 generally comprises a pair of rings 12 that is selectively mutually couplable. In one embodiment, the rings 12 are substantially circularly shaped. In another embodiment, the rings 12 are non-allergenic. In yet another embodiment, the rings 12 comprise plastic. In still yet another embodiment, the pair of rings 12 comprises a first loop 14 and a second loop 16. The first loop 14 is open and the second loop 16 is closed.

A first recess 18 is positioned in an inside face 20 of the first loop 14. The first recess 18 extends into the first loop 14 from an inner perimeter 22 of the first loop 14. The first recess 18 is complementary to a circumferential edge of an identification tag. The first recess 18 is configured to insert the identification tag.

A lip 24 couple to the first loop 14. The lip 24 extends around the first recess 18. A second recess 26 is positioned in the second loop 16. The second recess 26 is complementary to the lip 24. The second recess 26 is positioned to insert the lip 24 to couple the first loop 14 to the second loop 16. The pair of rings 12 is coupled to the circumferential edge of the identification tag so that indicia that are positioned on the identification tag are visible.

A hinge 28 is coupled to and extends between the rings 12. The rings 12 are selectively positionable in an open configuration and a closed configuration. In the open configuration, the rings 12 are configured to insert the identification tag. In the closed configuration, the rings 12 are adjacently positioned and the pair of rings 12 is coupled to the circumferential edge of the identification tag. The indicia that are positioned on the identification tag are visible.

Each of a pair of extrusions 30 is coupled to and extends from a respective ring 12 proximate to the hinge 28. The extrusions 30 are configured to deter insertion of the rings 12 into a narrow space, such as a gap between boards of a deck. Each extrusion 30 has a surface 32. The surface 32 is distal from the respective ring 12. In one embodiment, the surface 32 is arcuate. In another embodiment, the extrusions 30 comprise rubber.

At least one cutout 34 is positioned through the pair of rings 12. The at least one cutout 34 is configured to position a coupler that is coupled to the identification tag. The at least one cutout 34 is opposingly positioned relative to the hinge 28. In one embodiment, the at least one cutout 34 is substantially semi-circularly shaped.

A pair of slits 36 is opposingly positioned in a respective ring 12. The slits 36 are positioned substantially equally distant from the hinge 28. Each slit 36 is complementary to a head of a standard screwdriver. A respective slit 36 is configured to insert the head of the standard screwdriver to impart a prying force between the pair of rings 12 to decouple the pair of rings 12.

In one embodiment of the invention, the rings 12 are substantially rectangularly shaped. In this embodiment, the at least one cutout 34 comprises a first notch 38 and a second notch 40. The first notch 38 is positioned in a top 42 of the pair of rings 12. The second notch 40 is positioned in a side 44 of the pair of rings 12. Also in this embodiment, each of a pair of projections 46 is coupled to and extends from a respective ring 12. The projections 46 are opposingly positioned relative to the second notch 40. In another embodiment, the projections 46 comprise rubber. The first notch 38 and the second notch 40 are configured to selectively position the coupler that is coupled to the identification tag. The projections 46 are configured to deter insertion of the rings 12 into the narrow space, such as the gap between the boards of the deck.

In use, the hinge 28 is positioned on the rings 12 so that the rings 12 are selectively positionable in the open configuration. The rings 12 are configured to insert the identification tag into the first recess 18. The second recess 26 that is positioned in the second loop 16 is positioned to insert the lip 24 to couple the first loop 14 to the second loop 16. The pair of rings 12 is coupled to the circumferential edge of the identification tag. The indicia that are positioned on the identification tag are visible. The extrusions 30 that are positioned on the pair of rings 12 are configured to deter insertion of the rings 12 into the narrow space, such as the gap between the boards of the deck. The at least one cutout 34 that is positioned through the pair of rings 12 is configured to position the coupler that is coupled to the identification tag. The slits 36 are positioned in the respective ring 12 so that the respective slit 36 is configured to insert the head of the standard screwdriver to impart the prying force between the pair of rings 12 to decouple the pair of rings 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:

1. An identification tag covering device comprising:
   a pair of rings, said rings being selectively mutually couplable;
   a hinge coupled to and extending between said rings;
   a pair of extrusions, each said extrusion being coupled to and extending from a respective said ring proximate to said hinge, said extrusions comprising rubber;
   at least one cutout positioned through said pair of rings; and
   wherein said hinge is positioned on said rings such that said rings are selectively positionable in an open configuration, wherein said rings are configured for inserting an identification tag, and a closed configuration, wherein said rings are adjacently positioned and said pair of rings is coupled to a circumferential edge of the identification tag such that indicia positioned on the identification tag are visible, wherein said extrusions are positioned on said pair of rings such that said extrusions are configured for deterring inserting of said rings into a narrow space wherein said at least one cutout is positioned through said pair of rings such that said at least one cutout is configured for positioning a coupler coupled to the identification tag.

2. The device of claim 1, further including said rings being substantially circularly shaped.

3. The device of claim 1, further including said rings being comprised of a non-allergenic material.

4. The device of claim 1, further including said rings comprising plastic.

5. The device of claim 1, further including each said extrusion having a surface, said surface being distal from said respective said ring, said surface being arcuate.

6. The device of claim 1, further including said at least one cutout being opposingly positioned to said hinge, said at least one cutout being substantially semi-circularly shaped.

7. An identification tag covering device comprising:
   a pair of rings, said rings being selectively mutually couplable, said pair of rings comprising a first loop and a second loop, said first loop being open, said second loop being closed;
   a hinge coupled to and extending between said rings;
   a pair of extrusions, each said extrusion being coupled to and extending from a respective said ring proximate to said hinge;
   at least one cutout positioned through said pair of rings; and
   wherein said hinge is positioned on said rings such that said rings are selectively positionable in an open configuration tag, wherein said rings are configured for inserting an identification tag, and a closed configuration, wherein said rings are adjacently positioned and said pair of rings is coupled to a circumferential edge of the identification tag such that indicia positioned on the identification tag are visible, wherein said extrusions are positioned on said pair of rings such that said extrusions are configured for deterring inserting of said rings into a narrow space wherein said at least one cutout is positioned through said pair of rings such that said at least one cutout is configured for positioning a coupler coupled to the identification tag.

8. The device of claim 7, further including a first recess positioned in an inside face of said first loop, said first recess extending into said first loop from an inner perimeter of said first loop, said first recess being complementary to the circumferential edge of the identification tag, wherein said first recess is positioned in said first loop such that said first recess is configured for inserting the identification tag.

9. The device of claim 8, further comprising:
a lip couple to said first loop, said lip extending around said first recess;
a second recess positioned in said second loop, said second recess being complementary to said lip; and
wherein said second recess is positioned in said second loop such that said second recess is positioned for inserting said lip for coupling said first loop to said second loop such that said pair of rings is coupled to the circumferential edge of the identification tag such that the indicia positioned on the identification tag are visible.

10. An identification tag covering device comprising:
a pair of rings, said rings being selectively mutually couplable;
a hinge coupled to and extending between said rings;
a pair of extrusions, each said extrusion being coupled to and extending from a respective said ring proximate to said hinge;
at least one cutout positioned through said pair of rings;
wherein said hinge is positioned on said rings such that said rings are selectively positionable in an open configuration, wherein said rings are configured for inserting an identification tag, and a closed configuration, wherein said rings are adjacently positioned and said pair of rings is coupled to a circumferential edge of the identification tag such that indicia positioned on the identification tag are visible, wherein said extrusions are positioned on said pair of rings such that said extrusions are configured for deterring inserting of said rings into a narrow space—wherein said at least one cutout is positioned through said pair of rings such that said at least one cutout is configured for positioning a coupler coupled to the identification tag; and
a pair of slits opposingly positioned in a respective said ring such that said slits are substantially equally distant from said hinge, each said slit being complementary to a head of a standard screwdriver, wherein said slits are positioned in said respective said ring such that a respective said slit is configured for inserting the head of the standard screwdriver for imparting a prying force between said pair of rings for decoupling said pair of rings.

11. An identification tag covering device comprising:
a pair of rings, said rings being selectively mutually couplable;
a hinge coupled to an extending between said rings;
a pair of extrusions, each said extrusion being coupled to and extending from a respective said ring proximate to said hinge;
at least cutout positioned through said pair of rings;
wherein said hinge is positioned on said rings such that said rings are selectively positionable in an open configuration, wherein said rings are configured for inserting an identification tag, and a closed configuration, wherein said rings are adjacently positioned and said pair of rings is coupled to a circumferential edge of the identification tag such that indicia positioned on the identification tag are visible, wherein said extrusions are positioned on said pair of rings such that said extrusions are configured for deterring inserting of said rings into a narrow space—wherein said at least one cutout is positioned through said pair of rings such that said at least one cutout is configured for positioning a coupler coupled to the identification tag;
said rings being substantially rectangularly shaped;
said at least one cutout comprising a first notch positioned in a top of said pair of rings and a second notch positioned in a side of said pair of rings;
a pair of projections, each said projection being coupled to and extending from a respective said ring, said projections being opposingly positioned relative to said second notch; and
wherein said first notch and said second notch are positioned in said pair of rings such that said first notch and said second notch are configured for selectively positioning the coupler coupled to the identification tag, wherein said projections are positioned on said pair of rings such that said projections are configured for deterring inserting of said rings into the narrow space.

12. The device of claim 11, further including said projections comprising rubber.

13. An identification tag covering device comprising:
a pair of rings, said rings being selectively mutually couplable, said rings being substantially circularly shaped, said rings being non-allergenic, said rings comprising plastic, said pair of rings comprising a first loop and a second loop, said first loop being open, said second loop being closed;
a first recess positioned in an inside face of said first loop, said first recess extending into said first loop from an inner perimeter of said first loop, said first recess being complementary to a circumferential edge of an identification tag, wherein said first recess is positioned in said first loop such that said first recess is configured for inserting the identification tag;
a lip couple to said first loop, said lip extending around said first recess;
a second recess positioned in said second loop, said second recess being complementary to said lip, wherein said second recess is positioned in said second loop such that said second recess is positioned for inserting said lip for coupling said first loop to said second loop such that said pair of rings is coupled to the circumferential edge of the identification tag such that indicia positioned on the identification tag are visible;
a hinge coupled to and extending between said rings, wherein said hinge is positioned on said rings such that said rings are selectively positionable in an open configuration, wherein said rings are configured for inserting the identification tag, and a closed configuration, wherein said rings are adjacently positioned and said pair of rings is coupled to the circumferential edge of the identification tag such that the indicia positioned on the identification tag are visible;
a pair of extrusions, each said extrusion being coupled to and extending from a respective said ring proximate to said hinge, wherein said extrusions are positioned on said pair of rings such that said extrusions are configured for deterring inserting of said rings into a narrow space each said extrusion having a surface, said surface being distal from said respective said ring, said surface being arcuate, said extrusions comprising rubber;
at least one cutout positioned through said pair of rings, wherein said at least one cutout is positioned through said pair of rings such that said at least one cutout is configured for positioning a coupler coupled to the identification tag, said at least one cutout being opposingly positioned to said hinge, said at least one cutout being substantially semi-circularly shaped;

a pair of slits opposingly positioned in a respective said ring such that said slits are substantially equally distant from said hinge, each said slit being complementary to a head of a standard screwdriver, wherein said slits are positioned in said respective said ring such that a respective said slit is configured for inserting the head of the standard screwdriver for imparting a prying force between said pair of rings for decoupling said pair of rings; and wherein said hinge is positioned on said rings such that said rings are selectively positionable in the open configuration, wherein said rings are configured for inserting the identification tag into said first recess, wherein said second recess is positioned in said second loop such that said second recess is positioned for inserting said lip for coupling said first loop to said second loop such that said pair of rings is coupled to the circumferential edge of the identification tag such that the indicia positioned on the identification tag are visible, wherein said extrusions are positioned on said pair of rings such that said extrusions are configured for deterring inserting of said rings into the narrow space wherein said at least one cutout is positioned through said pair of rings such that said at least one cutout is configured for positioning the coupler coupled to the identification tag, wherein said slits are positioned in said respective said ring such that said respective said slit is configured for inserting the head of the standard screwdriver for imparting the prying force between said pair of rings for decoupling said pair of rings.

14. The device of claim 13, further comprising:

said rings being substantially rectangularly shaped;

said at least one cutout comprising a first notch positioned in a top of said pair of rings and a second notch positioned in a side of said pair of rings;

a pair of projections, each said projection being coupled to and extending from a respective said ring, said projections being opposingly positioned relative to said second notch, said projections comprising rubber; and wherein said first notch and said second notch are positioned in said pair of rings such that said first notch and said second notch are configured for selectively positioning the coupler coupled to the identification tag, wherein said projections are positioned on said pair of rings such that said projections are configured for deterring inserting of said rings into the narrow space.

* * * * *